US007338377B2

(12) United States Patent
Shinoda

(10) Patent No.: US 7,338,377 B2
(45) **Date of Patent: *Mar. 4, 2008**

(54) TOKEN WITH BUILT-IN IC CHIP

(75) Inventor: Tomohiro Shinoda, Tokyo (JP)

(73) Assignee: Aruze Co., Ltd. (JP)

( * ) Notice: Subject to any disclaimer, the term of this patent is extended or adjusted under 35 U.S.C. 154(b) by 276 days.

This patent is subject to a terminal disclaimer.

(21) Appl. No.: 10/644,094

(22) Filed: Aug. 20, 2003

(65) Prior Publication Data

US 2004/0106457 A1 Jun. 3, 2004

(30) Foreign Application Priority Data

Aug. 20, 2002 (JP) ............................ 2002-239692

(51) Int. Cl.
*G06F 17/00* (2006.01)

(52) U.S. Cl. ........................................................ 463/47

(58) Field of Classification Search .................. 463/43, 463/29, 30

See application file for complete search history.

(56) References Cited

U.S. PATENT DOCUMENTS

| | | | | |
|---|---|---|---|---|
| 4,890,842 | A | 1/1990 | Plange | |
| 5,766,077 | A * | 6/1998 | Hongo | 463/30 |
| 6,021,949 | A * | 2/2000 | Boiron | 235/492 |
| 6,255,949 | B1 * | 7/2001 | Nicholson et al. | 340/572.8 |
| 6,460,851 | B1 * | 10/2002 | Lee et al. | 273/238 |
| 6,468,162 | B1 * | 10/2002 | Nakamura | 463/43 |
| 6,601,139 | B1 * | 7/2003 | Suzuki | 711/115 |
| 6,650,870 | B2 * | 11/2003 | White et al. | 273/237 |
| 6,727,862 | B2 * | 4/2004 | Tomon | 343/895 |
| 6,773,325 | B1 * | 8/2004 | Mawle et al. | 446/175 |
| 6,877,096 | B1 * | 4/2005 | Chung et al. | 713/185 |
| 2001/0039206 | A1 * | 11/2001 | Peppel | 463/31 |
| 2003/0195044 | A1 * | 10/2003 | Narita | 463/43 |
| 2003/0220144 | A1 * | 11/2003 | Brown | 463/43 |
| 2003/0224856 | A1 * | 12/2003 | Bukovsky et al. | 463/42 |
| 2004/0002387 | A1 * | 1/2004 | Grady | 463/43 |

FOREIGN PATENT DOCUMENTS

| | | |
|---|---|---|
| DE | 197 53 285 A1 | 1/2000 |
| GB | 2334456 * | 8/1999 |
| GB | 2334456 A * | 8/1999 |
| JP | 6-110853 | 4/1994 |
| JP | 7-68051 | 3/1995 |
| JP | 7-204314 | 8/1995 |
| JP | 8-71205 | 3/1996 |

(Continued)

OTHER PUBLICATIONS

Diablo, blizard entertainment, copyright 1996, all pages.*

*Primary Examiner*—Ronald Laneau
*Assistant Examiner*—Tramar Harper
(74) *Attorney, Agent, or Firm*—Antonelli, Terry, Stout, & Kraus, LLP

(57) ABSTRACT

A token with built-in IC chip, which is very entertaining, is provided for a gaming machine. The token is provided with an IC chip incorporated therein, in which a game initial data set selected from a data group comprising a plurality of game initial data sets has been stored before starting a game in a storage section of the token with built-in IC chip.

26 Claims, 8 Drawing Sheets

FOREIGN PATENT DOCUMENTS

| | | | |
|---|---|---|---|
| JP | 9-325759 | | 12/1997 |
| JP | 10-108959 | | 4/1998 |
| JP | 11-473 | | 1/1999 |
| JP | H11-019330 | A | 1/1999 |
| JP | 2000-48182 | | 2/2000 |
| JP | 2000-224664 | | 8/2000 |
| JP | 2001-113043 | | 4/2001 |
| JP | 2001-187273 | | 7/2001 |
| JP | 2001-293133 | | 10/2001 |
| JP | 2001-331269 | | 11/2001 |
| JP | 2002-18378 | | 1/2002 |
| JP | 2003-38858 | | 2/2003 |
| JP | 2003-175154 | | 6/2003 |
| WO | WO 95/51384 | | 11/1998 |
| WO | WO 9851384 | A1 * | 11/1998 |
| WO | WO 99/41719 | | 8/1999 |
| WO | WO 02/22222 | A1 | 3/2002 |

* cited by examiner

TOKEN WITH BUILT-IN IC CHIP

CROSS-REFERENCE TO RELATED APPLICATIONS

This application is based upon and claims the benefit of priority from the prior Japanese Patent Application No. 2002-239692 filed on Aug. 20, 2002, the entire contents of which are incorporated herein by reference.

This application is related to a co-pending U.S. patent application Ser. No. 10/644,082, filed Aug. 20, 2003 and entitled "Gaming Machine and Server Therefor". The co-pending application is expressly incorporated herein by reference.

BACKGROUND OF THE INVENTION

1. Field of the Invention

This invention relates to a token with built-in IC chip that is used for a gaming machine that utilizes a token.

2. Related Art

A recent game that is manufactured in Japan and supplied as a video game or an arcade game combines the latest hardware and software technology. A composite art or integrated industry of the game with an advanced graphic display technology for displaying characters, backgrounds, etc., and a sophisticated speculative method such as plot development is highly evaluated not only in Japan but also around the world. A video game is a type of game to be played with a home video gaming machine or a portable gaming machine. An arcade game is a type of game that is played with an arcade video gaming machine installed in a game hall (so-called game arcade).

These kinds of games range widely and may include, for example, a racing game which displays simulatively a horse race or an auto race, a sports game which displays simulatively a baseball game or a football game, a story game in which a character moves freely in the predetermined region to obtain an item disposed on a map, and a fighting game in which a player may compete with a professional wrestling, boxing, sumo wrestling, judo, kendo (Japanese fencing), and other martial arts using swords or spears.

Recently, people especially enjoy a strategic simulation game among the provided video games.

In the strategic simulation game, the player controls a leader of a group such that the leader may direct a unit that belongs to the group and experiences a fictional strategy and combat in a virtual environment or space being deployed on a screen such as television screen.

In such strategic simulation games, the player controls, for example, a character of Oda Nobunaga (a leader of a group) who governs the Owarino-kuni (Owari region), organizes military commanders (a head of the unit belonging to the group) to be his followers, develops his own military group by utilizing a military draft and training, battles and defeats an opponent group (opponent group) lead by another feudal lord such that he may expand his own territory and finally unify the country during a fictional Japanese Warring States Period.

As described above, the player as the leader of the group in the strategic simulation game can battles an opponent by ordering the unit belonging to the group under various strategies. The player can gain various experience as the leader of the group and commanders of the units such that the player easily enjoy virtual strategies and battles.

Generally, the strategic simulation game requires several or several tens of hours in order to accomplish the final purpose. Many players devote themselves to the game over a long period of time enjoying virtual strategies and battles. In this respect, the strategic simulation game is significantly different from that in another category including an action game, a shooting game, a puzzle game, etc.

On the other hand, the arcade game is often elaborated. For instance, a music game for the player to actually dance or play instruments to a rhythm, an airplane simulation game utilizing a mock pilot's seat in the plane cockpit, and so on are quite popular such that some of them may become a boom in the society. The token game having been widely spread, however, still remains popular among the arcade games.

In the token game, the player purchases one or more tokens from a token inscription machine such that the player starts the token game with the gaming machine by inserting the token. If the player wins the game, a predetermined number of tokens are paid out. So, the player who has obtained many tokens through this can enjoy the game again without purchasing a new token.

In such typical token game as a roulette, card games, a horse racing, etc., the way to use tokens is quite simple. Therefore, it is not easy to provide the player with a novel sensation or surprise and it may become difficult to attract more and more players and to make the token game so popular as to make a boom.

Thus, recently, a gaming machine where an innovative idea is introduced is in demand and the gaming machine that utilize tokens has been provided where a plurality of players can simultaneously play a horse racing game that includes a breeding mode and a racing mode, as a gaming machine for a simulation game that utilizes tokens in order to respond to such demand.

In the breeding mode of such a horse racing game a plurality of players can, for example, breed and train virtual horses owned by the players by inserting tokens and in the racing mode the players follow the necessary procedures for a race such as selecting jockeys by inserting tokens so that the virtual horses owned by the player can be made to run a race while betting tickets for each race can be bought by inserting tokens so that the player can receive tokens in accordance with a race result.

In the gaming machine that provides the breeding mode and racing mode, as described above, however, the tokens are paid out in accordance with the result of each race and the number of tokens paid out is not closely related to the content of the game. In this regard, such a gaming machine that provides the breeding mode and the racing mode does not essentially differ from a conventional game utilizing tokens and, therefore, it is difficult to attract new players, unlike a gaming machine where an innovative idea is introduced.

Accordingly, it is possible to provide a gaming machine that utilizes tokens and have an entertainment value that a conventional gaming machine does not have, in addition to the entertainment value of the game itself, by adding a new value in the game to the tokens used for the gaming machine that utilizes tokens.

SUMMARY OF THE INVENTION

An object of this invention is to provide a token for a gaming machine that utilizes tokens to make the gaming machine that utilizes tokens (hereinafter, "gaming machine") very entertaining. In addition, according to another aspect of the invention, a token is provided that can stimulate the desire of a player to purchase more tokens.

Here, the token in this specification and the claims may be used as a medal such that either token or medal may be used with the gaming machine according to this invention.

This invention provides a token incorporating an IC chip (herein after, "token with built-in IC chip",) characterized in that one game initial data set is selected from a game initial data group comprising a plurality of game initial data sets and that the one game initial data set has been stored in a storage section before the game starts or before the token is used with the gaming machine in order to achieve the above described object.

More concretely, this invention provides the following: (1) A token with built-in IC chip for a gaming machine comprising a storage section being capable of storing at least a game initial data set, wherein one game initial data set selected from a game initial data group comprising a plurality of game initial data sets has been stored beforehand in the above described storage section.

According to (1) of this invention, the token with built-in IC chip is provided with a storage section in which at least a game initial data set can be stored, And one game initial data set is selected from a game initial data group comprising a plurality of game initial data sets such that the one game initial data set has been stored beforehand in the above described storage section. Therefore, it is possible for a player to acquire a token with built-in IC chip in which the one game initial data set is stored. Here, the stored one game initial data set may differ from that in a token with built-in IC chip according to each purchase of the token with built-in IC chip.

Here, the storage section may comprise any kind of memory such as a flash memory, a dynamic RAM, a static RAM, and so on. The storage section may comprise any kind of storage if it can be embedded or incorporated in the token.

In a case where the game initial data set regarding one samurai commander (game initial data set regarding Oda Nobunaga, game initial data set regarding Takeda Shingen, or the like) has been stored beforehand in a token with built-in IC chip when the token with built-in IC chip is used for the gaming machine for providing a strategic simulation game having a background of the Warring States Period, for example. A player can obtain a token with built-in IC chip in which the game initial data set regarding Oda Nobunaga has been stored beforehand, a token with built-in IC chip in which the game initial data set regarding Takeda Shingen has been stored beforehand, or a token with built-in IC chip in which the game initial data set regarding other samurai commanders has been stored beforehand when the player purchases the token with built-in IC chip.

In addition, these tokens with built-in IC chip have new values that do not exist in conventional tokens and have different values in the strategic simulation game for the player, although their appearances are not different from each other.

In addition, the player collects tokens with built-in IC chip in which such data set is stored and, thereby, it becomes possible to play the strategic simulation game using one type of token with built-in IC chip in which the data set is stored regarding Oda Nobunaga for a certain period of time as well as to play the strategic simulation game using another type of token with built-in IC chip in which the data is stored regarding Takeda Shingen for a certain period of time. Furthermore, a plurality of tokens with built-in IC chip have values differing from each other and, therefore, it becomes possible for the player to develop an emotional attachment to the token with built-in IC chip in which the data set regarding the character (samurai commander) that the player likes is stored.

As described above according to (1) of this invention, the token has a new value that does not exist in conventional tokens and each of the tokens has, in advance, a value that differs from other tokens and, therefore, the desire of the player to collect tokens (tokens with built-in IC chip) is stimulated and the player can develop an emotional attachment to the token so that the desire of the player to purchase more tokens with built-in IC chip can be stimulated.

In addition, it is possible to encourage the player to devote himself/herself to the game by allowing tokens with built-in IC chip according to (1) of this invention to be used in the gaming machine and, furthermore, the gaming machine has an entertainment value that a conventional gaming machine does not have as well as the entertainment value of the game itself so that a very entertaining gaming machine wherein the entertainment value is doubled can be realized.

(2) A token with built-in IC chip used for a gaming machine provided with a storage section being capable of storing at least a game initial data set is characterized in that the token with built-in IC chip has stored a game initial data set selected from a game initial data group comprising a plurality of game initial data sets in the above described storage section before using the token with built-in IC chip for a game.

According to (2) of this invention, the token with built-in IC chip is provided with a storage section that can store at least a game initial data set. The storage section of the token with built-in IC chip stores one game initial data set selected from a game initial data group comprising a plurality of game initial data sets before using the token with built-in IC chip for the game. Therefore, it is possible for a player to acquire a token with built-in IC chip in which the game initial data set is stored. The game initial data set may differ according to each purchase of the token with built-in IC chip. Thus, tokens with built-in IC chip, in which one or more game initial data sets differing from those in other tokens may be stored, have new values that do not exist in conventional tokens and have different values in the strategic simulation game for the player, although their appearances are not necessarily different.

In addition, the player collects tokens with built-in IC chip in which such data set is stored and, thereby, it becomes possible to play the strategic simulation game using the token with built-in IC chip having a different game initial data set to each game. Furthermore, a plurality of tokens with built-in IC chip may have different values among them and, therefore, it becomes possible for the player to develop an emotional attachment to the token with built-in IC chip in which the data set regarding the character (samurai commander) that the player likes is stored.

As described above, according to (2) of this invention, the token has a new value that does not exist in conventional tokens and each of the tokens has, prior to use of the token for the game, a value that differs from other tokens. Therefore, the desire of the player to collect tokens (tokens with built-in IC chip) is stimulated and the player can develop an emotional attachment to the token so that the desire of the player to purchase more tokens with built-in IC chip can be stimulated.

In addition, it is possible to encourage the player to devote himself/herself to the game by allowing the token with built-in IC chip according to (2) of this invention to be used in the gaming machine and, furthermore, the gaming machine has an entertainment value that a conventional gaming machine does not have as well as another entertainment value of the game itself so that a very entertaining gaming machine that utilizes tokens wherein the entertainment value is doubled can be realized.

(3) The token with built-in IC chip according to the above described (1) or (2) is characterized in that the game initial data set stored in the above described storage section comprises a game initial data set selected in a random manner from the above described game initial data group.

According to (3) of this invention, the type of game initial data set stored in each token with built-in IC chip beforehand is determined in a random manner and, therefore, it is difficult for the player to easily obtain the token with built-in IC chip in which the desired game initial data set is stored. And in some cases, the player may obtain the token with built-in IC chip in which the desired game initial data set is stored. As a result, the desire to obtain the token with built-in IC chip in which the desired game initial data set is stored can be stimulated so that the desire of the player to purchase more tokens with built-in IC chip is encouraged.

(4) The token with built-in IC chip according to any one of the above described (1) through (3) is characterized in that the above described data group comprises a game initial data set having a bonus data set that is advantageous to the player of the game.

According to (4) of this invention, the player can acquire a token with built-in IC chip in which the game initial data set containing the above described bonus data set has been stored beforehand in some cases when the player purchases the token with built-in IC chip. In addition, the game can be started in a condition where a predetermined benefit is provided in the game when a token with built-in IC chip in which the game initial data set having a bonus data set has been stored beforehand is used and, therefore, the game can proceed in a favorable manner.

Thus, tokens with built-in IC chip that may be purchased by the player include a token with built-in IC chip to which an additional value of the bonus data set has been added. Furthermore, a token with built-in IC chip to which an additional value of the bonus data set has been added and a token with built-in IC chip to which no additional value has been added have different values in the game and, thereby, the desire to obtain the token with built-in IC chip to which the additional value has been added can be stimulated so that the desire of the player to purchase more tokens with built-in IC chip can be greatly encouraged.

(5) The token with built-in IC chip according to any one of the above described (1) through (4) is characterized in that the token with built-in IC chip is formed in one-piece construction with an object having a three dimensional shape. Or, it is configured to be integrated with an object having a three-dimensional shape.

According to (5) of this invention, the Object having a three-dimensional shape, for example, may resemble a character in the game. Thereby, the emotional attachment of the player to the token (token with built-in IC chip) can be enhanced so that the desire to collect tokens is further stimulated and it becomes possible to encourage the player to further devote himself/herself to the game. Here, the object having a three-dimensional shape comprises an action figure. The action figure has a three-dimensional shape and the shape may be similar to a figure imitating or being associated with a character in the game.

(6) The token with built-in IC chip according to any one of the above described (1) through (5) is characterized in that the token with built-in IC chip is used for a gaming machine that provides a strategic simulation game.

The token may be paid out from a gaming machine as a result of a game a player has played such that the player may obtain a new token with built-in IC chip, in which another game initial game data set may be stored. The player may use or utilize the paid out token with another gaming machine or another satellite of the same gaming machine the player has played. Therefore, the player may use or utilize the token to play a strategic simulation game with any gaming machine.

In general, the number of characters that can be controlled by the player among the characters in the game is great in comparison with games in the other categories. Therefore, the number of game initial data sets included in the game initial data group can be increased when, for example, the game initial data set regarding one character (samurai commander) is stored in one token with built-in IC chip so that it is possible to purchase tokens with built-in IC chip having a variety of values.

Accordingly, it becomes possible for the player to collect a great number of tokens with built-in IC chip having different values and to play the game using these tokens with built-in IC chip, of which the number is great. As a result, the desire of the player to collect tokens (tokens with built-in IC chip) can be dramatically enhanced and it becomes possible to encourage the player to further devote himself/herself to the game.

The gaming machine may be a gaming machine provided with a token insertion slot for inserting tokens and a token payout outlet for paying out tokens. The gaming machine may also be a gaming machine where a player inserts a token into the above described token insertion slot so as to play a game and where tokens may be paid out from the above described token payout outlet as a result of the actions of the player. It is also possible to insert a token into the above described gaming machine while the game is in progress.

Here, it is possible for one player, alone, to play a game on the above described gaming machine and it is possible for a plurality of players to simultaneously play the game. In addition, the above described gaming machine is provided with as many satellites as the number of players that can simultaneously play the game on the gaming machine.

The satellite in this specification refers to a device that allows the game to proceed. Specifically, the device comprises: a control unit including one or more control buttons or levers or knobs that a player controls to input a predetermined instruction; and an image display device for displaying images concerning the game, wherein the game displayed on the gaming machine proceeds in accordance with the operation of the above described control unit by the player while the player views images displayed on the above described image display device.

In the gaming machine according to this invention, the number of satellites is not limited. The number can be set any numerals depending on the size of the gaming machine., the nature of the game, and so on.

The token denotes a substance that enables the player to playing the game with the gaming machine by inserting the substance into the gaming machine. The substance generally is formed into a coin shape or an imitated coin. The above-mentioned token may be different from the coin as a currency circulating in the real society. The above-mentioned token may be purchased, for example, through a token inscription machine installed in a game hall or a game arcade. The token obtained by a game result generally may not be exchanged for money or goods.

The number of tokens inserted into the gaming machine according to this invention, for example, may be stored as the game point in a storage media (for example a RAM, a flash memory, etc) built in the gaming machine and/or the token with built-in IC chip placed or set at a predetermined position of the gaming machine. On the other hand, when the player controls to input a predetermined instruction, the same number of tokens may be paid out as corresponding to the number of the stored points.

The point used herein refers to information about the game that is equivalent to the number of the coins so that the player may play the game by inputting such information into the above-mentioned gaming machine. For example, if the game can be started by inserting ten tokens into the gaming machine according to this invention, the game can also be started by inputting ten points instead ten tokens.

The token with built-in IC chip refers to a token used for the above described gaming machine that utilizes tokens, and refers to a token with built-in IC chip that is provided with a storage section in which the game initial data set, at least, can be stored. According to this invention, one game initial data set selected from a game initial data group being composed of a plurality of game initial data sets has been stored in advance in the above described storage section.

Here, the game history data set, which is a data set regarding the status of the game in progress, may be stored, in addition to the game initial data set, during the course of the game in progress or at the time that the game is interrupted.

In addition, it is possible for one player to use one or more tokens with built-in IC chip at the time that the player plays the game on the gaming machine that utilizes tokens according to this invention.

The above-mentioned storage section may be composed of, for example, an EPROM (Erasable Programmable ROM), an OTPROM (Optical Programmable ROM), an EEPROM (Electrically Erasable Programmable ROM), a flash memory (flash EEPROM), and so on. In addition, the token with built-in IC chip may be provided with, for example, a microcomputer having a CPU (central processing unit), a DRAM (dynamic random access memory), a mask ROM, as well as a control gate array that renders a function of an interface circuit, and the like, in addition to the above described storage section. In this specification, that the data set is stored in the storage section of the token with built-in IC chip refers to that the data set is stored in the token with built-in IC chip unless it is otherwise indicated.

A shape of the above-mentioned token with built-in IC chip is not limited. But it is preferably disk-shaped like an ordinary token so that the token with built-in IC chip is recognized without a sense of discomfort. It is desirable that the size and thickness of the above-mentioned token with built-in IC chip are substantially the same as those of the ordinary token.

Material of the above-mentioned token with built-in IC chip is not limited, resin can be used, for example. The token may be made of metal if the IC chip or pins thereof are coated with resin or the like so that insulation of the embedded IC chip and pins thereof to each other is secured.

The game initial data set refers to a data set required for commencement of the game with the above described gaming machine that utilizes tokens, and a data set regarding characters controlled by the player can be cited as such game initial data set. In addition, the bonus data set described below is also included in the above described game initial data set.

In addition, a data set regarding the types of units and capability values may be included in the game initial data set stored in the token with built-in IC chip according to this invention in the case where the above described token with built-in IC chip is used for the gaming machine that utilizes tokens for providing the strategic simulation game.

In this specification, the game initial data group refers to a data group composed of a plurality of game initial data sets. Here, the above described data group need not contain all the types of game initial data sets that can be used for the game with the gaming machine that utilizes tokens. However, the data group may include a part of the game initial data set used for the game with the gaming machine that utilizes tokens.

The maximum number of combinations of numeric values is 1000 in the case where the types of units R (0 to 9), capability value S (ranging from 0 to 9) and capability value T (ranging from 0 to 9) are set in the game initial data set used for a game so that a maximum of 1000 types of game initial data sets, for example, can exist. In this case, the above described data group is composed of 1000 types of game initial data sets.

Here, the above described data group according to this invention need not contain all the types of game initial data sets that can exist. The above described data group of the above example maybe composed of apart (500 pieces, for example) of the 1000 types of game initial data sets.

In addition, the above described data group may be a real data group or may be a virtual data group.

A data group composed of a game initial data set fixed according to a predetermined table can be cited as an example of a real data group. Thus, the respective items of the game initial data set are set beforehand in the game initial data set fixed according to the predetermined table. On the other hand, a data group composed of game initial data sets comprising combinations of numeric values of the respective items to be set can be cited as an example of a virtual data group in the case where the numeric values of the respective items (types of units, capability values, and the like) of the game initial data set can be set by means of a predetermined random number generation function. In this case, the respective items of game initial data set are not set beforehand.

One game initial data set selected from the above described data group is stored beforehand in a token with built-in IC chip according to this invention.

At this time, it is desirable for the stored game initial data set to be one game initial data set selected from the above described data group in a random manner.

This is because the type of game initial data set stored in each token with built-in IC chip beforehand is assigned in a random manner and, therefore, it is difficult for the player to easily obtain the token with built-in IC chip in which the desired game initial data set is stored and, contrarily, in some cases the player may obtain the token with built-in IC chip in which the desired game initial data set is stored. As a result, the desire to obtain the token with built-in IC chip in which is stored the desired game initial data set can be stimulated so that the desire of the player to purchase more tokens with built-in IC chip is encouraged.

Here, the method of randomly selecting one game initial data set from the data group so that the token with built-in IC chip Stores the selected data, for example, may comprise a method of storing the above described table beforehand in a predetermined device (computer provided with an element that can write data into a token with built-in IC chip, for example), and randomly selecting a number so that one of game initial data sets in the above table corresponding to the result of random number selection is selected, and storing the selected one game initial data set in the token with built-in IC chip. The method of randomly selecting one game initial data set from the data group may also comprise a method of randomly selecting a number in the predetermined device as described above so that the result thereof is stored in a token with built-in IC chip as the game initial data set.

On the other hand, one deliberately selected game initial data set, instead of one game initial data set randomly selected from a data group as described above, may be stored in a token with built-in IC chip. It is possible, for example, to enhance the value of a token with built-in IC chip in which the game initial data set having a bonus data set or a game initial data set having a set high ability is stored by lowering the probability of obtaining such token with built-in IC chip. In this case, also, it is possible to stimulate the desire of the player to purchase more tokens with built-in IC chip.

In this specification, the bonus data set refers to a data set included in the above described game initial data set and/or refers to a data set for providing a predetermined benefit in the game to the player when the data set is read-out to, and used for, the gaming machine that utilizes tokens. Such bonus data set is not particularly limited and the data set regarding the above described number of points can be cited as an example of such data set. Here, not all of the game initial data sets contain a bonus data set in this invention. However, rather, only a certain number of the game initial data sets among all of the game initial data sets include such bonus data set.

When it is mentioned in the specification that the game initial data set is stored beforehand, the game initial data set has been stored prior to the provision of the token with built-in IC chip to the player. That the game initial data set is stored in advance may concretely refers to that the game initial data set has been stored prior to the issuance of the token with built-in IC chip by means of a dispenser of tokens installed in the game arcade (game hall). Thus, for example, a token with built-in IC chip is issued by the above described dispenser of tokens after the game initial data set is written onto the token.

In addition, that the game initial data set is stored beforehand may refer to that the data set has been stored in the token with built-in IC chip before usage of this token with built-in IC chip for the game in the case where writing of the game initial data set is not carried out in a game arcade, such as the case where a token with built-in IC chip is issued by a dispenser of tokens installed in the game arcade without any game Initial data sets being written onto the token with built-in IC chip.

In addition, that the game initial data set is stored prior to usage of a token with built-in IC chip for a game refers to that the game initial data set has been stored before writing the data set onto the token with built-in IC chip by means of a gaming machine that utilizes tokens or before reading the data set from the above described token with built-in IC chip.

In this specification, an identification data set refers to a data set assigned to an individual player, a token with built-in IC chip and a game arcade (game hall) and is a data set stored in the above described token with built-in IC chip. In addition, an ID code and a check code for identifying the player, individual player data, data regarding an initial setting at the time of commencement of the game, and the like, can be cited as examples of data assigned to the individual player.

Here, the above described game initial data set, the data group, the bonus data set and the identification data set are described below in detail by citing concrete examples.

In addition, in this specification, "game history data set" indicates a data set regarding the status of the game in progress in the above described gaming machine that utilizes tokens.

It is desirable for the above described token with built-in IC chip to be integrally configured with a design of a three-dimensional shape.

Since the design having a three-dimensional shape (it may be referred to as "action figure," hereinafter.) resembles the appearance of the character in the game and, thereby, the emotional attachment of the player to the token (token with built-in IC chip) is enhanced so that a desire to collect tokens can be further increased. Therefore, it may be possible to encourage the player to devote himself or herself to the game even more. Here, it is not necessary that the token with built-in IC chip is configured so integrally with the action figure that the action figure may be fixed firmly and cannot be removed from the token. The action figure may be configured so as to be detachable from the token, which is disk-shaped. Here, the token with built-in IC chip configured so as to be integrated with an action figure is described below in detail in reference to the drawings.

In the gaming machine of this invention although the above described tokens with built-in IC chip may be used in place of the ordinal or conventional token, it is desirable for the above described tokens with built-in IC chip to be used together with the ordinal or conventional tokens.

The token with built-in IC chip that stores a data set concerning game characters and the conventional token can be simultaneously used and. Therefore, it becomes possible to simultaneously utilize different tokens of different values so that it becomes possible to provide a very interesting game such that different tokens including either conventional token or token with built-in IC chip can be paid out depending on, for example, the situation of the game in progress.

In addition, it is desirable for the gaming machine of this invention to output the above described tokens with built-in IC chip in response to the predetermined conditions that have been satisfied in the game in progress.

When predetermined conditions are satisfied during the game in progress, tokens with built-in IC chip can be paid out, so that the desire of the player to collect tokens (tokens with built-in IC chip) can be further enhanced and it becomes possible to further encourage the player to devote himself or herself to the game. The predetermined conditions are not particularly limited, but for example it may include a condition that one group of the player defeats another group in a battle can be cited.

The simulation game herein may refer to one game category and be defined with a common concept in the art. For instance, the simulation game may be a game in which the player can enjoy a virtual world with a virtual environment and/or a virtual space provided.

The strategic simulation game may refer to a game, among the above-mentioned simulation games, in which the player can experience and enjoy, especially, virtual strategies and battles in the virtual environment and virtual space provided (referred to "virtual environment" hereinafter).

The gaming machine according to this invention may preferably be a gaming machine for supplying a strategic simulation game. The above-mentioned token with built-in IC chip according to this invention is preferably used for the gaming machine to supply the strategic simulation game.

In general, the strategic simulation game has a larger number of characters that appear on the game and can be controlled by the player than that in another game category does. By storing data of different characters in as many tokens with built-in IC chip, the player can collect a plurality of tokens with built-in IC chip with different values and play the game with so many tokens with built-in IC chip.

As a result, the desire for collection of tokens (tokens with built-in IC chip) is enhanced significantly so that the gaming machine may increase the amusement of the game.

The group used herein is a virtual group (military group) that can be controlled by the player in the virtual environment or the like and that is provided by the above-mentioned strategic simulation game. The group is composed of a leader and a unit described later. For example, if the strategic simulation game adopts the Japanese territory in the Warring State Period as a virtual environment, the above-mentioned group may include a military group led by Oda Nobunaga, or Takeda Shingen, or the like.

If the strategic simulation game adopts a modern war as a virtual environment, the above-mentioned group may include a military force such as a tank, a warship, and a fighter airplane.

The unit in the specification refers to one unit to constitute the above-mentioned group. The above-mentioned group is composed of one or more units. For example, if above-mentioned group is an army (or military group) led by Oda Nobunaga, the group is composed of an army unit led by Hashiba Hideyoshi and Hashiba Hideyoshi himself, and so on. If the above-mentioned group is a military force including tanks, battleships and battle planes, the unit configuring the group includes tanks, battleships and battle planes. The leader refers to a head of the unit among the above-mentioned units. For example, if the above-mentioned group is an army group led by Oda Nobunaga, the leader is Oda Nobunaga himself.

The above-mentioned group, unit, and leader may have various capability values in various items, respectively. The capability values vary depending on conditions of the strategic simulation game in progress. The data concerning the group, unit, and leader may include data concerning such capability values. The data concerning the group, unit, and leader are stored in the token with built-in IC chip as the initial data set or the history data set of the game.

One token with built-in IC chip may store data concerning the entire group, or data concerning one or more units belonging to the group. However, one token with built-in IC chip preferably stores data concerning one unit belonging to one group in consideration of an increase of desire for the player to collect such tokens.

DETAILED DESCRIPTION OF THE INVENTION

The embodiments of this invention are described below with reference to the drawings.

In the following, a token with built-in IC chip used for a gaming machine for providing a strategic simulation game wherein virtual battles and strategies can be carried out in a Japanese Warring States Period, which is a virtual environment, as well as the above described gaming machine, are described. In addition, the token with built-in IC chip according to this invention, wherein the game initial data set regarding one unit has been stored before the token is used for the game is also described.

Figure 1A:
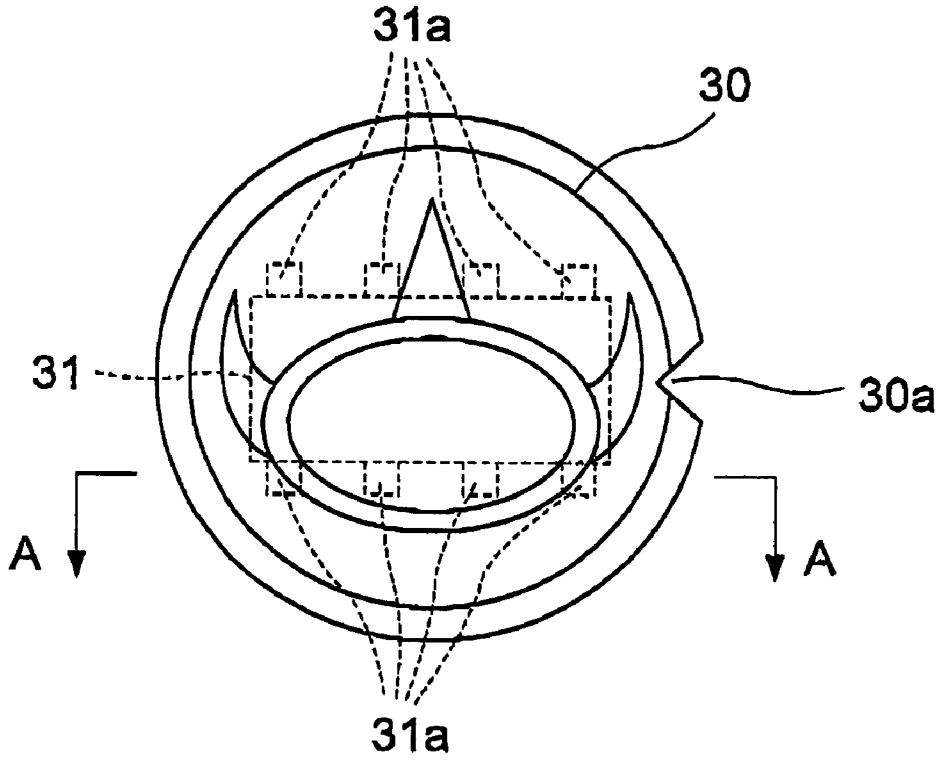
FIG. 1A is a plan view of a token with built-in IC chip according to an embodiment of this invention.
Figure 1B:
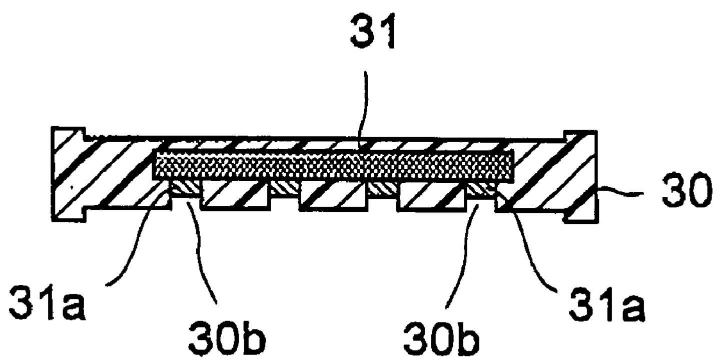
FIG. 1B is a cross sectional view along line A-A in FIG. 1A.

FIG. 1A is a plan view schematically showing the token with built-in IC chip according to this invention and FIG. 1B is a cross sectional view along line A-A of FIG. 1A.

A token 30 with a built-in IC chip (token with built-in IC chip) is in an approximate disk form and an ornament (so-called relief) in the form of a Japanese helmet in the Warring States Period is formed on the front surface of token with built-in IC chip 30, as shown in FIG. 1A. A notch 30*a* for positioning is provided in a portion of the periphery of the token with built-in IC chip 30.

In addition, an IC chip 31 having eight pins 31*a* is embedded inside the token with built-in IC chip 30. This IC chip 31 is provided with a storage section that can store, at least, a game initial data set.

As shown in FIG. 1B, eight openings 30*b* are provided on the bottom (or tail) face of token with built-in IC chip 30 and eight pins 31*a* of IC chip 31 are exposed to the outside through recesses 32*a*. The game 10 machine described below that utilizes tokens can read out the game initial data set stored in the above described storage section via these pins 31*a*.

Figure 1C:
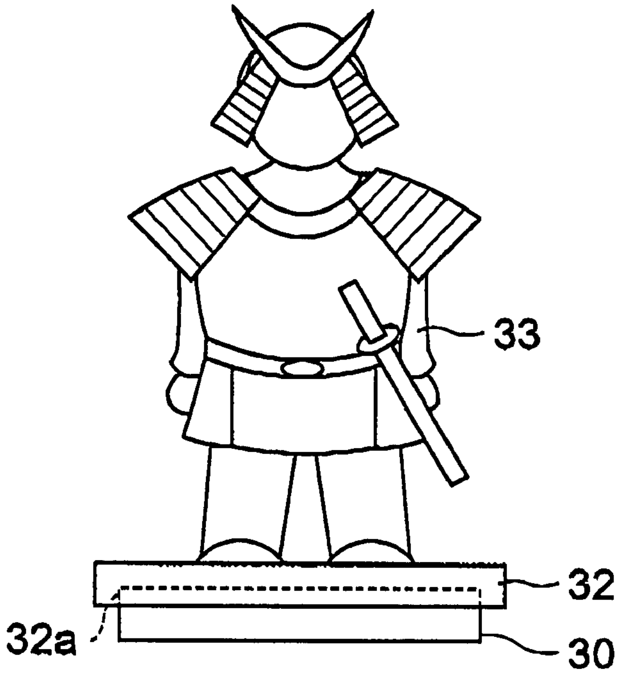
FIG. 1C is a front view of a token with built-in IC chip according to an embodiment of this invention. The token is integrally formed with a three-dimensional action figure.
Figure 1D:
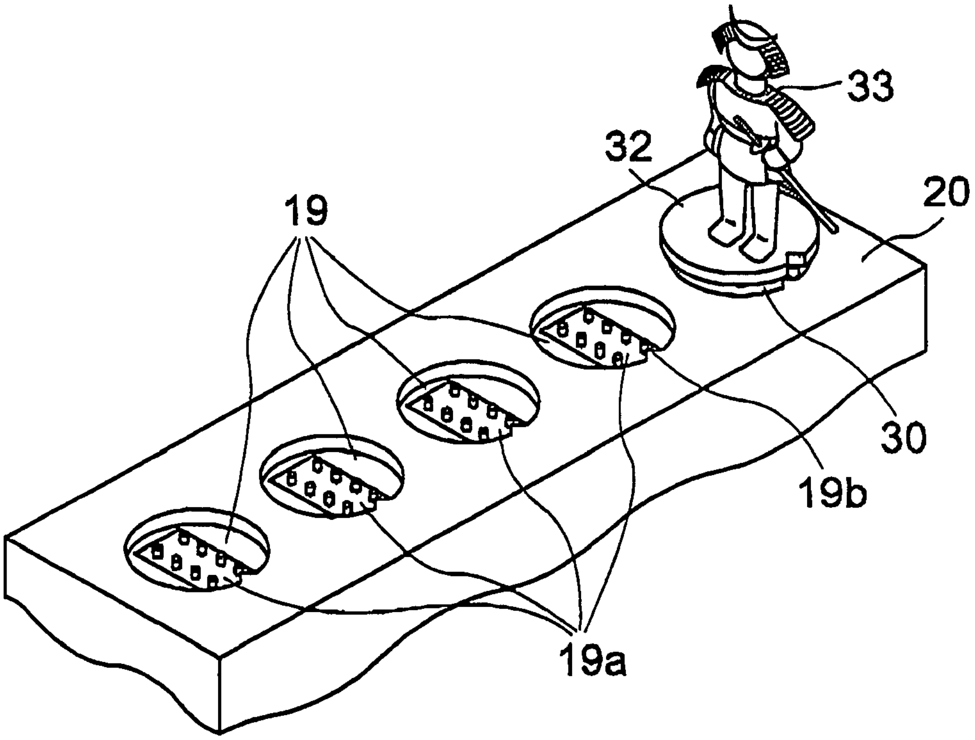
FIG. 1D is a perspective view of a token receiving unit of a gaming machine with the token with built-in IC chip in FIG. 3A installed on a support of the token receiving unit for installation according to an embodiment of this invention.

Here, it is preferable for the tokens with built-in IC chip described in reference to FIGS. 1A through 1D to be formed so as to be integrated with an action figure in order to enhance the emotional attachment of the player to the token (token with built-in IC chip) and in order to further stimulate the desire of the players to collect tokens. FIG. 1C is a front view schematically showing a token with built-in IC chip formed so as to be integrated with an action figure.

A portion including the top (or head) face of token with built-in IC chip 30 is fitted into and secured in a recess 32*a* formed in the bottom face of the base portion 32 in a disk form, as shown in FIG. 1C. In addition, an action FIG. 33 resembling a samurai commander of the Warring States Period and being made of resin is secured to the top face of base portion 32 and token with built-in IC chip 30 is formed so as to be integrated with the action FIG. 33. Here, this action FIG. 33 resembles the appearance of a character (unit) in a strategic simulation game provided in the gaming machine 10.

Here, it is not necessary for a token with built-in IC chip according to this invention to be formed so as to be integrated with a body (action figure) having a three-dimensional shape.

Figure 2:
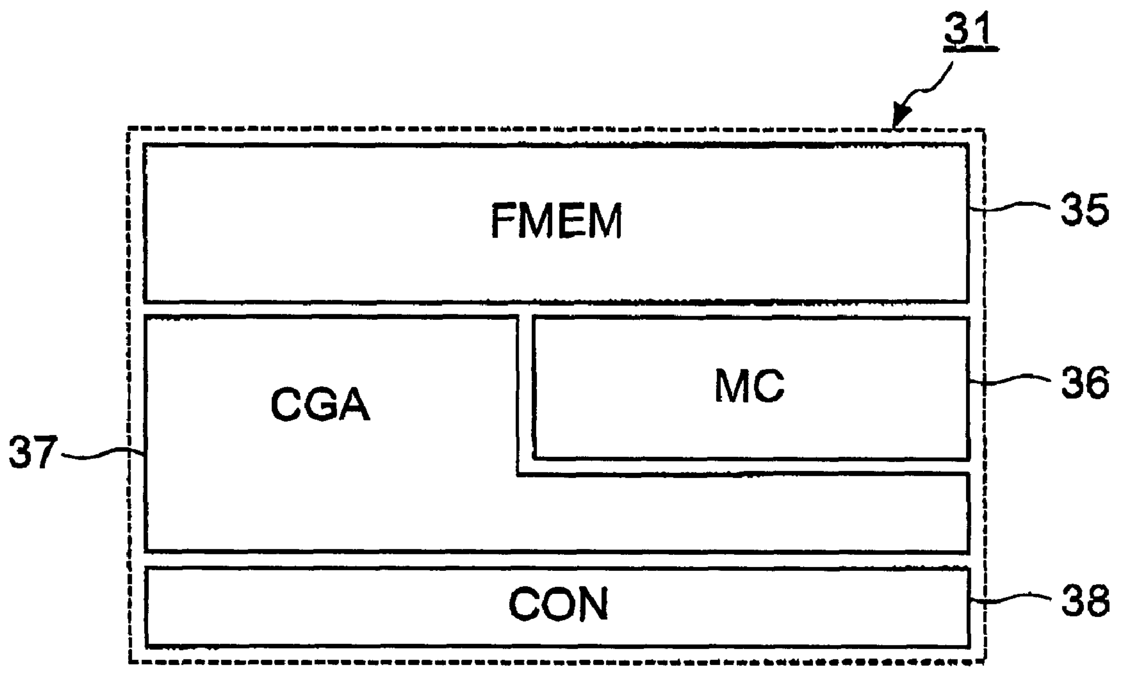
FIG. 2 is a block diagram showing the internal structure of the token with built-in IC chip shown in FIGS. 1A through 1D.

FIG. 2 is a block diagram schematically showing the internal structure of an IC chip 31.

IC chip 31 is provided with a flash memory (FMEM) 35, which is a storage section, a microcomputer (MC) 36, a control gate array (CGA) 37, and a connector (CON) 38.

The game initial data set has been stored in flash memory 35 before the token is used for the game. In addition, the game history data set is stored in the flash memory 35 in accordance with the progress of the game.

The microcomputer 36 is provided with a CPU, a ROM, a RAM and the like, as described above and this CPU primarily controls each portion of the IC chip 31 based on a control program, such as firmware stored in the ROM.

In addition, an ID code assigned, without overlapping, to the individual token with built-in IC chip may be stored in the above described ROM. Here, a variety of identification data other than the ID code assigned to the individual token with built-in IC chip may be stored in the above described ROM or may be stored in the flash memory 35.

The control gate array 37 is a combination of a variety of standard logic gates and a portion thereof functions as an interface circuit for electrically connecting token with built-in IC chip 30 with the gaming machine while satisfying predetermined interface conditions. In addition, the connector 38 makes a physical contact with a portion of the gaming machine so as to secure an electrical connection therebetween.

Figure 3:
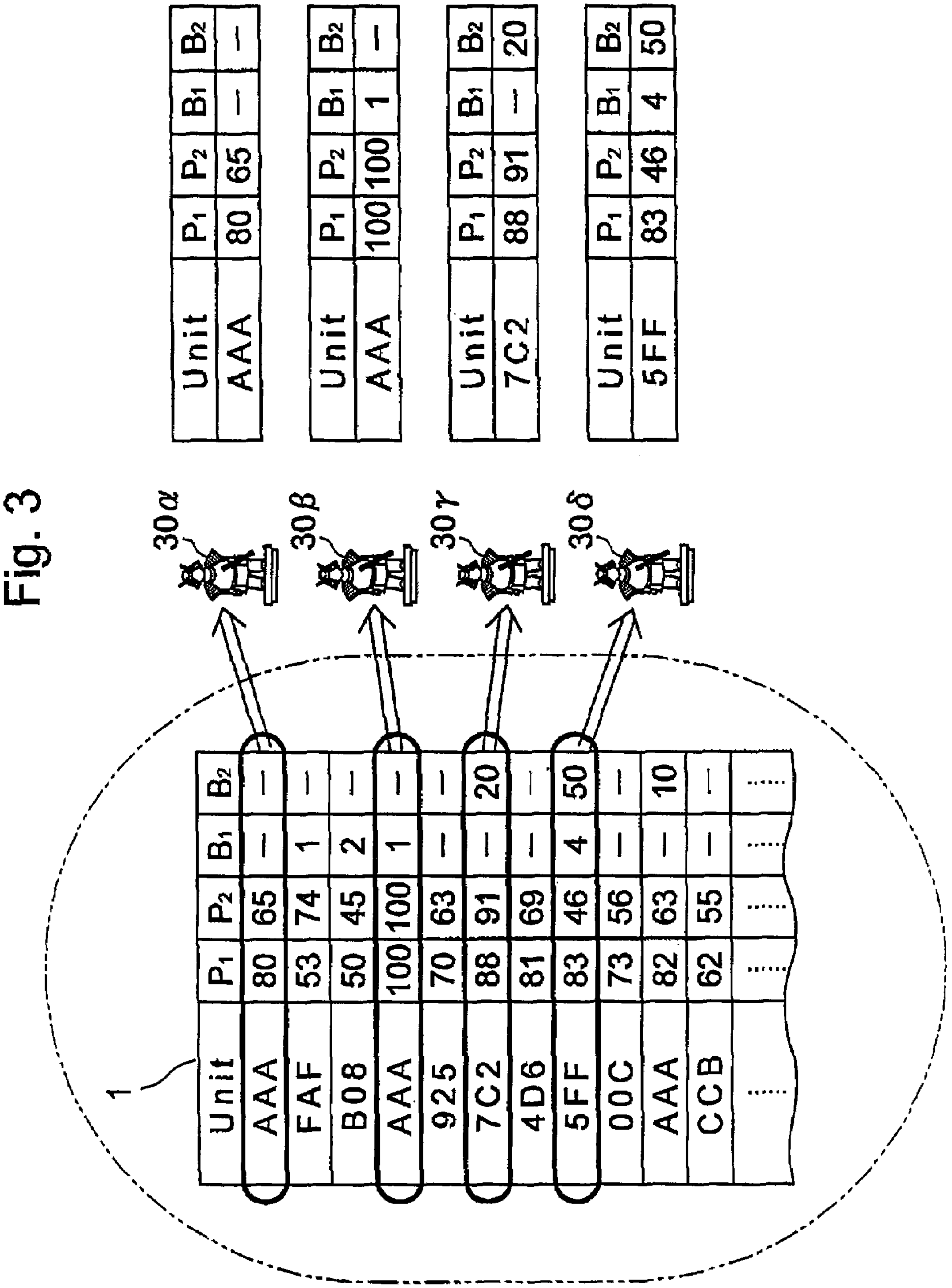
FIG. 3 is a diagram showing a game initial data set stored in the token with built-in IC chip shown in FIGS. 1A through 1D.

FIG. 3 is a diagram showing a game initial data set stored in the token with built-in IC chip.

The game initial data setting table 1 has five columns and a plurality of rows wherein five kinds of data in one row make one game initial data set. That is to say, a plurality of kinds of game initial data are set in each game initial data set of the game initial data setting table 1. These game initial data sets constitute a data group and one of game initial data sets selected from this data group is stored in one token with built-in IC chip. Here, as described above this game initial data setting table is stored in a predetermined device (computer, or the like, provided with a device for allowing data to be written onto a token with built-in IC chip, for example).

The left item "unit" in the game initial data setting table 1is an item indicating the unit type and is set as a three digit hexadecimal number such as "AAA," "FAF," "B08," "AAA, "925," etc, as shown in the table starting from the top in this order. The second item "$P_1$" from the left in game initial data setting table 1is an item indicating one of a plurality of capability values set in the unit and is set in a number ranging from 0 to 100 such as "80," "53," "50," "100," "70," etc. as shown in the table starting from the top in this order.

The third item "$P_2$" from the left in game initial data setting table 1is an item indicating another one of a plurality of capability values set in the unit and is set in a number ranging from 0 to 100 such as "65," "74," "45," "100," "63," . . . as shown in the table starting from the top in this order.

In addition, the fourth item "$B_1$" from the left in the game initial data setting table 1is an item indicating the existence and the contents of the bonus data set for providing a predetermined profit in the game and "1" is set at the second row from the top, "2" is set at the third row, "1" is set at the fourth row and "4" is set at the eighth row.

The right item "$B_2$" in the game initial data setting table 1 is an item indicating the existence and the contents of the bonus data set in the same manner as "$B_1$" and "20" is set at the sixth row from the top, "50" is set at the eighth row and "10" is set at the tenth row.

Here, these bonus data sets do not exist in all of the game initial data sets in the game initial data setting table 1, as shown in FIG. 3.

As described above, a plurality of game initial data sets having a plurality of items is set in the game initial data setting table. The game initial data set at the top row has a unit type of "AAA," capability value $P_1$ of 80 and capability value $P_2$ of 65 with no bonus data sets existing therein. In addition, the game initial data set at the second row from the top has a unit type of "FAF," capability value $P_1$ of 53, capability value $P_2$ of 74 and bonus data set $B_1$ of 1.

The data group is formed of these game initial data sets.

Here, a plurality of game initial data sets regarding the same unit types is set in this game initial data setting table 1.

A game initial data set having a unit type of "AAA," capability value $P_1$ of 80 and capability value $P_2$ of 65 with no bonus data sets existing therein is set at the top row in the game initial data setting table 1, for example, while game initial data sets having the unit types of "AAA" are set at the fifth and tenth rows from the top in the game initial data setting table 1. Here, the capability values and the Like of these rows differ from each other.

Thus, it becomes possible to stimulate the desire of a player to purchase tokens by setting different capability values for units of the same type.

One game initial data set selected from the above described game initial data setting table 1is stored in a token with built-in IC chip according to an embodiment of this invention.

The game initial data set at the top row in the game initial data setting table 1, that is to say, the game initial data set having a unit type of "AAA," capability value $P_1$ of 80 and capability value $P_2$ of 65 with no bonus data sets existing therein is stored in the token with built-in IC chip 30α, for example.

In addition, game initial data set at the fourth row from the top in game initial data setting table 1is stored in token with built-in IC chip 30β and this game initial data set has a unit type of "AAA," capability value $P_1$ of 100, ability $P_2$ of 100 and bonus data set $B_1$ of 1.

Here, the game initial data set stored in the token with built-in IC chip 30β is the game initial data set regarding a unit of the same type as of the game initial data set stored in the token with built-in IC chip 30α and a high capability value is set therein in comparison with the game initial data set stored in token with built-in IC chip 30α. In addition, the bonus data set exists in the game initial data set stored in the token with built-in IC chip 30β. Accordingly, although a game can be played by controlling the same unit type regardless of which token with built-in IC chip is used in order to start the game, the game can be advanced in an advantageous manner when token with built-in IC chip 30β is used to start the game, in comparison with the case wherein token with built-in IC chip 30α is used to start the game.

In addition, the game initial data set at the sixth row from the top in game initial data setting table 1, that is to say, the game initial data set having a unit type of "7C2," capability value $P_1$ of 88, capability value $P_2$ of 91 and bonus data set $B_2$ of 20, is stored in the token with built-in IC chip 30γ.

Furthermore, the game initial data set at the eighth row from the top in the game initial data setting table 1, that is to say, the game initial data set having a unit type of "5FF," capability value $P_1$ of 83, capability value $P_2$ of 46, bonus data set $B_1$ of 4 and bonus data set $B_2$ of 50, is stored in the token with built-in IC chip 30δ.

Although a case is described in an example shown in FIG. 3 wherein a data group exists in a game initial data setting table, game initial data set selected from a virtual data group may be stored, as described above, according to the embodiment of this invention.

Next, a gaming machine is described, with which a game can be played by using a token with built-in IC chip as described above.

Figure 4:
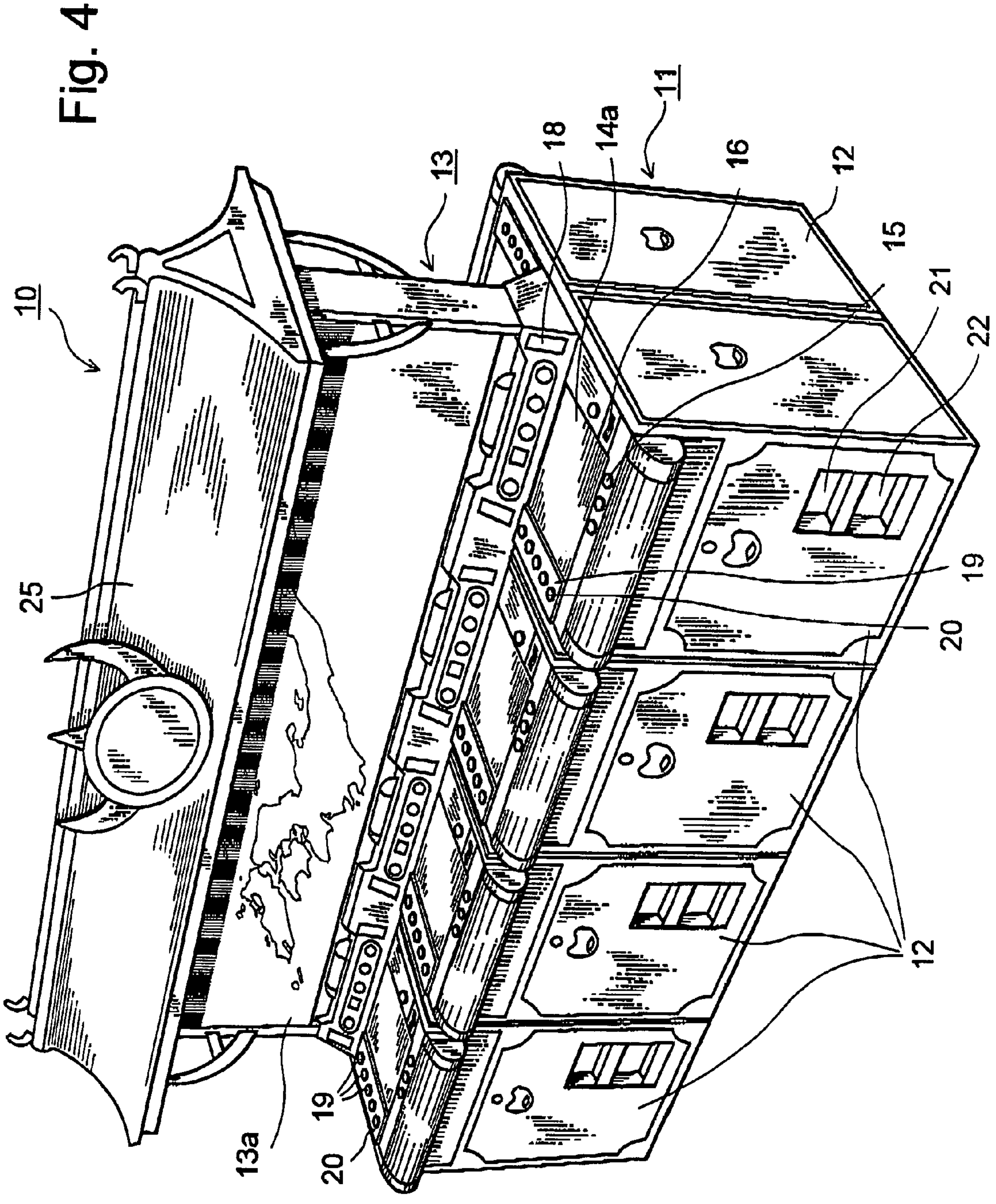
FIG. 4 is a perspective view of a gaming machine according to an embodiment of this invention.

FIG. 4 is a perspective view schematically showing an example of a gaming machine according to an embodiment of this invention.

The gaming machine 10 is provided with a main body device 11 composed of a total of eight satellites 12, with four satellites 12 in alignment with each other on the front side and four satellites 12 in alignment with each other on the rear side, as shown in FIG. 4, so that eight players at a maximum can simultaneously play a strategic simulation game on this gaming machine 10.

A large display device 13 having screens 13*a* on the front and back side, respectively, is installed so as to be vertical between the four front satellites 12 in alignment with each other and the four rear satellites 12 in alignment with each other above the top surface of main body device 11, Large images regarding the game are displayed on screens 13*a* of this large display device 13 and, therefore, people other than the players who are playing the strategic simulation game at the respective satellites 12 can also observe the strategic simulation game that is being carried out on this gaming machine 10. In addition, a roof 25 that imitates a portion of a castle in the Warring States Period is installed above the large display device 13.

An image display device 14 (not shown) is provided in each of satellites 12 constituting the main body device 11 so that screens 14*a* of image display devices 14 are exposed to the outside at the center of the top surface of the satellite 12 where a variety of images regarding the progress of the game are displayed on these screens 14*a*. In addition, the same images are not displayed at all times on the screens 14*a* of the image display devices 14 provided in the respective satellites 12 however, rather, images differing from each other are displayed on those screens in accordance with the status of the game in progress.

A control unit 15 formed of a plurality of control buttons is provided on the front side of a screen 14*a* of a satellite 12 so that a player can control a plurality of control buttons (control unit 15) while viewing the image displayed on screen 14*a* so as to continue the game.

A token insertion slot 16 is provided on the right side of the screen 14*a*. A token sensor 120 (not shown) is provided inside this token insertion slot 16 so that the token that has been inserted into token insertion slot 16 is detected by token sensor 120.

A support 20 for token with built-in IC chip installation that has five recesses 19 into which tokens with built-in IC chip 30, as described above, are engaged is provided on the left side of screen 14*a*. In addition, connectors 19*a* are provided at the bottoms of the recesses 19 so that connectors 19*a* are connected to a information reading/writing device 112 installed inside satellite 12. This information reading/writing device 112 can read out the game initial data set from tokens with built-in IC chip 30 that have been installed in recesses 19 via connectors 19*a* and can also write game history data set into these tokens with built-in IC chip 30. Accordingly, each player can simultaneously use five tokens with built-in IC chip at a maximum in order to play the strategic simulation game. In addition, a protrusion 19*b* for positioning is provided in a portion of the periphery of a recess 19. A token with built-in IC chip 30 is installed in a recess 19 so that this protrusion 19*b* engages in a notch 30*a* provided in token with built-in IC chip 30 and, thereby, eight terminals made of metal provided in the connector 19*a* can be inserted into eight openings 30*b* provided at the bottom of token with built-in IC chip 30.

A speaker 18 is provided in the back of screen 14*a* so that background music (hereinafter referred to as BGM), speech sound, sound effects, and the like, can be appropriately output in accordance with the status of the strategic simulation game in progress.

A token payout outlet 21 for paying out ordinary tokens and an outlet 22 for paying out tokens with built-in IC chip are provided on the front of satellite 12.

Although the inside satellite 12, in which token payout outlet 21 for paying out ordinary tokens is provided, is not shown, a hopper 121 and a token detection unit 122 are provided therein. When an instruction is input to the effect that tokens are to be paid out via control unit 15, tokens are paid out from hopper 121 and the outputted tokens are detected by token detection unit 122. After that, when token detection unit 122 detects a predetermined number of tokens, the payout of tokens from hopper 121 is complete.

In addition, outlet 22 for paying out tokens with built-in IC chip is an opening through which tokens with built-in IC chip are paid out, Although the inside of satellite 12, in which outlet 22 for paying out tokens with built-in IC chip is provided, is not shown, an information writing device 113 that can write data into a token with built-in IC chip and a built-in-IC-chip-token-payout device 114 for paying out tokens with built-in IC chip that pays out, from outlet 22 for paying out tokens with built-in IC chip, tokens with built-in IC chip into which data has been written in by means of information writing device 113 are provided inside satellite 12.

Next, the internal structure of the gaming machine of this invention is described.

Figure 5A:
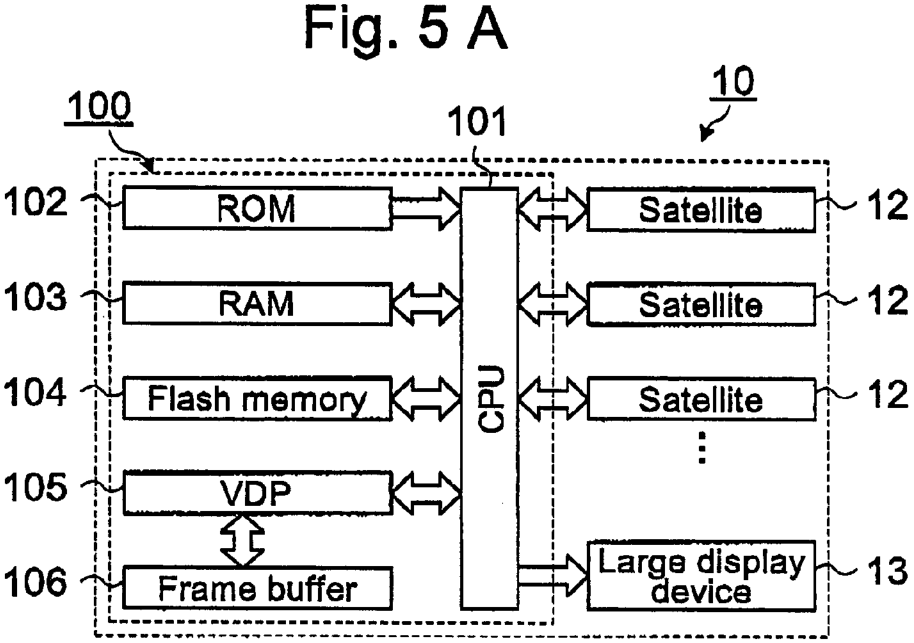
FIG. 5A is a block diagram of the gaming machine in FIG. 4.
Figure 5B:
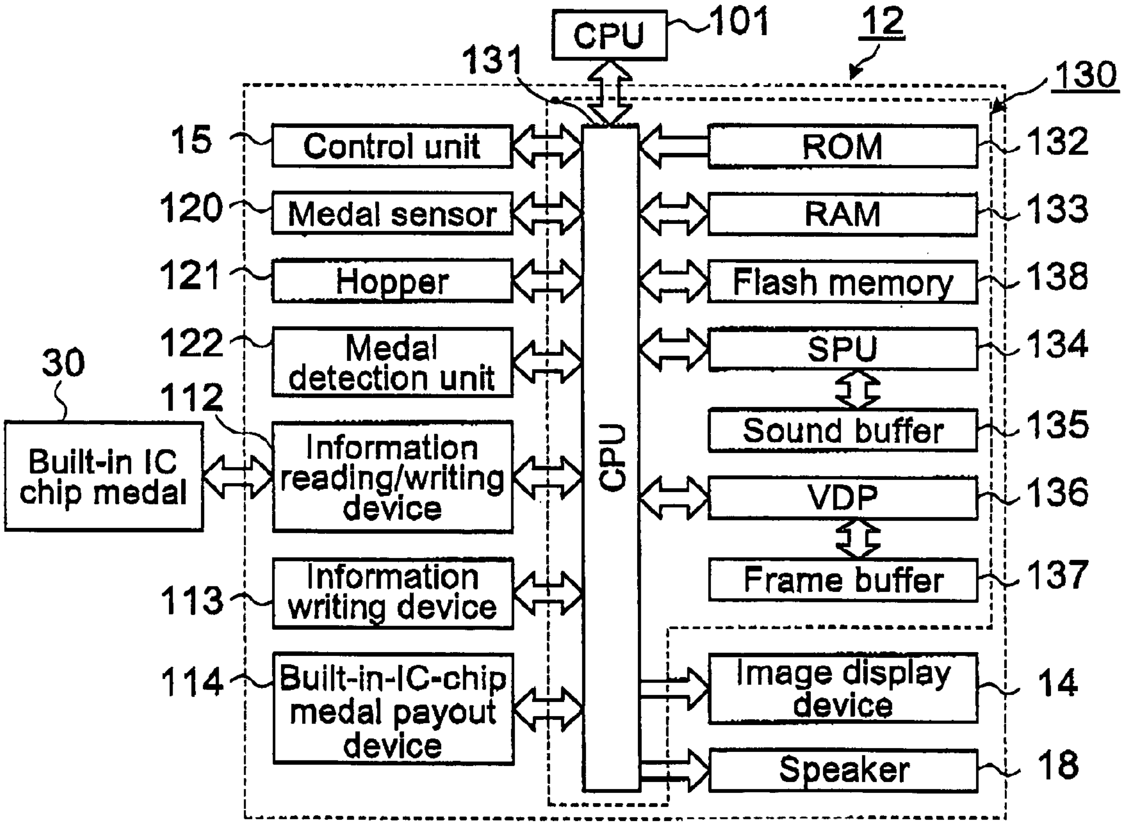
FIG. 5B is a block diagram of one of the satellites constituting the gaming machine in FIG. 5A.

FIG. 5A is a block diagram showing the internal structure of gaming machine 10 shown in FIG. 4 and FIG. 5B is a block diagram showing the internal structure of a satellite 12, which is a component of gaming machine 10.

As shown in FIG. 5A, gaming machine 10 is composed of a main control unit 100 that includes a CPU (central processing unit) 101, a ROM (read-only memory) 102, a RAM (random access memory) 103 and a flash memory 104, of eight satellites 12 and of a large display device 13. Here, all eight of the satellites are not shown in FIG. 5A.

The CPU 101 carries out a variety of processes based on input signals supplied from the respective satellites 12 as well as on data and programs stored in ROM the 102, the RAM 103, and the flash memory 104, and transmits a command signal to satellite 12 based on the result of the above described processing so as to primarily control the respective satellites 12 in the order that the strategic simulation game proceeds.

In addition, the CPU 101 is internally provided with a DSP (digital signal processor) and is formed so that processes can be carried out at high speed based on input signals received from respective satellites 12 as well as on data and programs stored in the ROM 102, the RAM 103, and the flash memory 104.

The ROM 102 is formed of a semiconductor memory, for example, and stores a program for implementing the basic functions of the gaming machine, a program for the progress of the strategic simulation game and a program for primarily controlling respective satellites 12 and, moreover, stores a variety of image data that is displayed on screens 13*a* of the large display device 13 and data regarding the capability values of the units constituting a group.

The RAM 103 temporarily stores the game initial data set and the game history data set supplied from the respective satellites 12 as well as data regarding the result of process carried out by the CPU 101. The above described game initial data set and the game history data set include data regarding groups and data regarding group leaders and units constituting groups. The flash memory 104 stores data regarding players of the game in the respective satellites 12.

Here, the flash memory 104 may store the data instead of the RAM 103 and the RAM 103 may store the data instead of the flash memory 104. In addition, it is not necessary for the flash memory 104 to be provided in the gaming machine 10.

In addition, a VDP (video digital processor) 105 and a frame buffer 106 are connected to the CPU 101 and, furthermore, the large display device 13 is connected to the main control unit 100 (CPU 101).

The VDP 105 reads out the necessary image data from the ROM 102 in accordance with the image formation order from the CPU 101 and composite image data is produced in the frame buffer 106 based on this image data. In addition, a 3D graphics accelerator may be mounted in the VDP 105. It becomes possible to increase the speed of processing to produce composite image data by means of the 3D graphics accelerator.

The frame buffer 106 is a memory wherein a composite image data is produced by VDP 105 and the above described composite image data is outputted to the large display device 13 by means of the VDP 105. The frame buffer 106 is usually composed of a dual port RAM for simultaneously allowing input of the image data from the VDP 105 and output of the composite image data to the large display device 13.

The large display device 13 displays the composite image data produced in the frame buffer 106 by the VDP 105 on the screens 13*a*.

This large display device 13 displays images that are the same as those displayed on screens 14*a* of the respective satellites 12 in accordance with the status of the strategic simulation game in progress and also displays images differing from the images displayed on the screens 14*a*.

Next, the satellites 12 connected to the CPU 101 of the main control unit 100 are described below.

The respective satellites 12 are composed of a control unit 130 and their peripheral devices, as shown in FIG. 5B.

The control unit 130 is composed of a CPU 131, a ROM 132, a RAM 133 and a flash memory 138 and, furthermore, includes an SPU (sound processing unit) 134, a sound buffer 135, a VDP 136, and a frame buffer 137.

The CPU 131 carries out a variety of processes based on an input signal supplied from control unit 15 in response to the operational input of the player as well as based on data and programs stored in the ROM 132, the RAM 133, and the flash memory 138, and the results thereof are transmitted to the CPU 101 of the above described main control unit 100.

On the other hand, the CPU 131 receives a command signal from the CPU 101, controls the peripheral device, which is a component of satellite 12, and the strategic simulation game proceeds in the satellite 12.

In addition, the CPU 131 carries out a variety of processes depending on the contents of the process based on an input signal supplied from the control unit 15 in response to the operational input of a player as well as based on data and programs stored in the ROM 132 and the RAM 133 and controls the peripheral device, which is a component of the satellite 12, based on the results of the above described processing so that the strategic simulation game proceeds in the satellite 12. Here, the type of method to be used for processing is set for each process in accordance with the contents of the process.

Furthermore, the CPU 131 is provided, as a co-processor, with a processor for operation of a matrix, a vector, and the like, regarding generation of image data. Thus, the results of the operation are transmitted to the VDP 136 described below as an image formation order.

The ROM 132 stores a program for implementing the basic functions of the satellites, a program necessary for carrying out the strategic simulation game, image data and sound data, such as PCM (pulse code modulation) data for BGM, speech sound, sound effects, and the like.

The RAM 133 stores the game initial data set and the game history data set read out from a token with built-in IC chip 30, for example, and, furthermore, temporarily stores data supplied from the CPU 101, data regarding a process that has been carried out by the CPU 131, and the like. The flash memory 138 stores data (game history data set, for example) regarding the players of the game at the satellites 12.

The SPU 134 is a sub-processor that incorporates a PCM sound source unit, for example, and is controlled by the CPU 131.

The CPU 131 selects and reads out the necessary sound data from among the sound data stored in the ROM 132 and transfers the data that has been read out to a sound buffer 135. The SPU 134 produces a sound signal for generating BGM, speech sound, sound effects, and the like, based on the above described sound data stored in the sound buffer 135 and transmits this sound signal to a speaker 18. As a result, the sound according to the above described sound data is outputted from the speaker 18.

The VDP 136 reads out the necessary image data from the ROM 132 in accordance with the image formation order from the CPU 131 and generates composite image data in the frame buffer 137 according to this image data. In addition, a 3D graphics accelerator may be mounted in the VDP 136. It becomes possible to increase the speed of processing for generating composite image data by means of the 3D graphics accelerator.

The frame buffer 137 is a memory for generating composite image data by means of the VDP 136 and the above described composite image data is outputted to the image display device 14 by means of the VDP 136. The frame buffer 137 is usually formed of a dual port RAM that allows the simultaneous input of image data from the VDP 136 and the simultaneous output of composite image data to the image display device 14.

The control unit 15, into which operations of the players are input, a token sensor for detecting a token inserted into the token insertion slot 16, a hopper 121 for paying out tokens, and a token detection unit 122 for detecting tokens paid out by the hopper are connected to the above described control unit 130 (CPU 131).

The control unit 15 is provided with a plurality of control buttons and when a predetermined instruction is input by a player through the operation of the control buttons, an instruction signal according to this instruction is supplied to the CPU 131. The CPU 131 carries out a variety of processes based on this instruction signal as well as on data and programs stored in the ROM 132, the RAM 133, and the flash memory 138.

The token sensor 120 transmits a detection signal to the CPU 131 after detecting a token that has been inserted in the token insertion slot 16. The CPU 131, which has received the above described detection signal, updates (increases) the number of points that have been stored in the RAM 133 and stores the updated number of points.

In the case wherein three tokens are inserted into the token insertion slot 16 when 10 points are stored in the RAM 133, for example, the token sensor 120 carries out metal detection three times and transmits a detection signal to the CPU 131 three times. The CPU 131 adds one point to the number of the points that are stored in the RAM 133 whenever a detection signal is received and stores the accumulated points. As a result, the RAM 133 stores 13 points.

The Hopper 121 is driven by the instruction signal from the CPU 131, which is issued in response to reception of an input of the operation for outputting points as tokens from the control unit 15, and carries out a process of paying out tokens.

The token detection unit 122 transmits a detection signal to the CPU 131 after detecting a token paid out from the hopper 121. The CPU 131 stores the indication of reception of a detection signal in the RAM 133 whenever a detection signal is received and transmits an instruction signal to the hopper 121 for stopping payout of tokens when it is determined that the number of times that a detection signal has been received reaches a predetermined number. As a result, payout of tokens by means of the hopper 121 is completed.

In addition, the information reading/writing device 112 is connected to the above described control unit 130 (CPU 131). This information reading/writing device 112 carries out read-out of game initial data set from a token with built-in IC chip 30 installed in a recess 19 of a support 20 for token with built-in IC chip installation and carries out write-in of game history data set into token with built-in IC chip 30 via the connector 19*a*.

That is to say, the information reading/writing device 112 carries out a recognition process of a token with built-in IC chip 30 installed in the recess 19 upon reception of an instruction signal from CPU 131 and carries out read-out of game initial data set from the token with built-in IC chip 30 as well as read-out of game history data set to the token with built-in IC chip 30 in the case wherein the installation of a token with built-in IC chip 30 has been recognized.

Here, data written onto a token with built-in IC chip 30 is the data stored in the ROM 132, the RAM 133 or the flash memory 138 and, in addition, data read-out from the token with built-in IC chip 30 is stored in the RAM 133 or in the flash memory 138 by means of the CPU 131.

In addition, the information writing device 113 and a built-in-IC-chip-token-payout device 114 for paying out tokens with built-in IC chip are connected to the control unit 130 (CPU 131).

This information writing device 113 carries out a process of write-in of data regarding units to the token with built-in IC chip 30 that has been stored in a predetermined place within the satellite 12 after an instruction signal issued from the CPU 131 is received in response to the satisfaction of predetermined conditions during the strategic simulation game in progress.

In addition, the built-in-IC-chip-token-payout device 114 for paying out tokens with built-in IC chip carries out a payout process of the tokens with built-in IC chip 30, into which data regarding the units has been written, from outlet 22 for paying out tokens with built-in IC chip upon receipt of an instruction signal from the CPU 131.

Furthermore, the image display device 14 and the speaker 18 are connected to the control unit 130 (CPU 131).

The image display device 14 displays composite image data produced in the frame buffer 137 by the VDP 136 on the screens 14*a* while speaker 18 receives a sound signal generated by the SPU 134 so as to emit the sound based on this sound signal. The images displayed on these screens 14*a* and the sound outputted from the speaker 18 are produced in the strategic simulation game in progress.

A player controls the control unit 15 while recognizing the images displayed on these screens 14*a* and the sound emitted from the speaker 18 and, thereby, continues the strategic simulation game.

The game initial data set stored in the token with built-in IC chip according to an embodiment of this invention is read out to the above described gaming machine when the token with built-in IC chip is used for the above described gaming machine. Then, images based on the above described game initial data set are displayed on the image display devices provided in the satellites of the gaming machine so that a game is started.

Next, the images which are displayed on the screens of the image display devices provided in the satellites of the gaming machine, when a token with built-in IC chip according to this invention is used for the above described gaming machine so as to start a game, are described in reference to the drawings.

FIGS. 6A through 6D are diagrams schematically showing examples of images displayed on the screens 14*a* of the image display devices 14 provided in the satellites of the gaming machine.

Figure 6A:
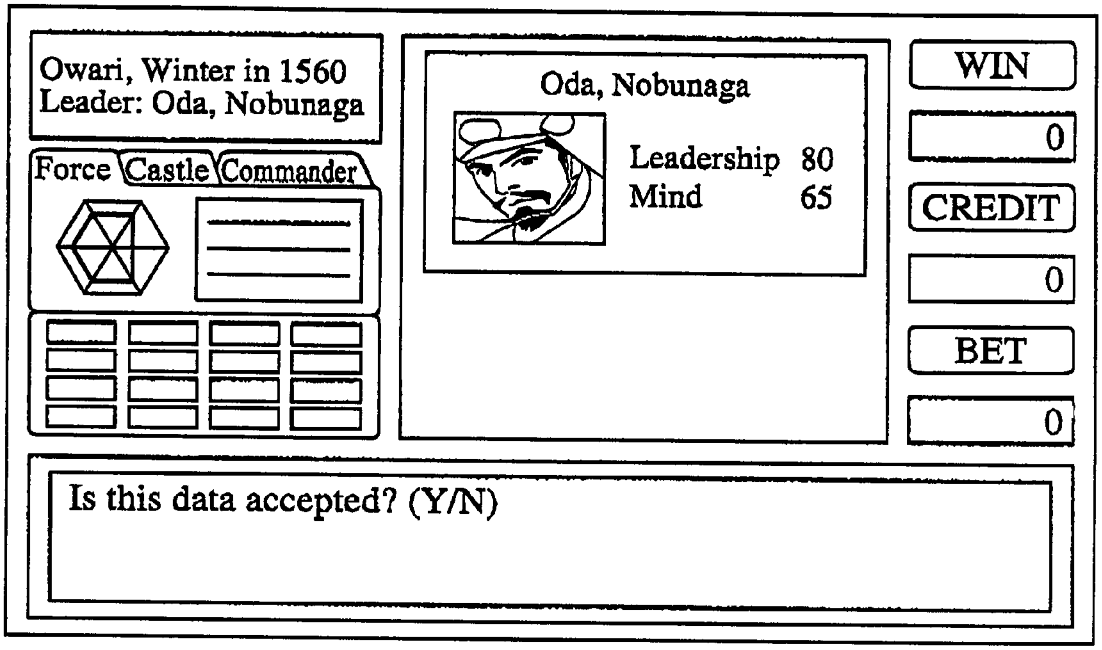
FIGS. 6A through 6D are diagrams schematically showing examples of images displayed on the screen of the image display provided in a satellite of the gaming machine.

The screen image shown in FIG. 6A is a screen image displayed on screens 14*a* of image display devices 14 provided in the satellite 12 when the token 30α with a built-in IC chip shown in FIG. 3 is used to start the game.

The image "Owari, Winter in 1560" displayed at the top left of the screen is an image indicating the virtual year, season and location of the group in the strategic simulation game while the image "Leader: Oda Nobunaga" displayed beneath the image "Owari, Winter in 1560" is an image indicating that the leader of the group (hereinafter referred to as group A), which is controlled by a player who is going to start the strategic simulation game at the satellite 12, is Oda Nobunaga. Furthermore, an image indicating the capability values of group A, controlled by the player who is going to start the strategic simulation game at the satellite 12, is displayed beneath the screen "Leader: Oda Nobunaga."

An image showing the facial expression of "Oda Nobunaga" who is the leader of group A and an image showing the capability values are displayed in the center portion of the screen.

This image showing the capability values is a displayed image based on the game initial data set stored in token with built-in IC chip 30α. That is to say, "Leadership" is displayed as "80" in response to capability value $P_1$ set in the game initial data set and "Mind" is displayed as "65" in response to capability value $P_2$ set in the game initial data set. "WIN," "0," "CREDIT," "10," ABET" and "0" shown on the right side of the screen indicate that the number of accumulated tokens acquired by a player who is going to start the strategic simulation game at satellite 12 is 0, the points stored in the RAM 133 of the satellite 12 is 0, and the like.

In addition, an operational procedure wherein "Is this data accepted?" is displayed on the lower portion of the screen and "(Y/N)," indicating the selection, is shown in response to this operational procedure.

At this time, the strategic simulation game can be started using token with built-in IC chip 30$a$ in the case where the player selects "Y."

Figure 6B:
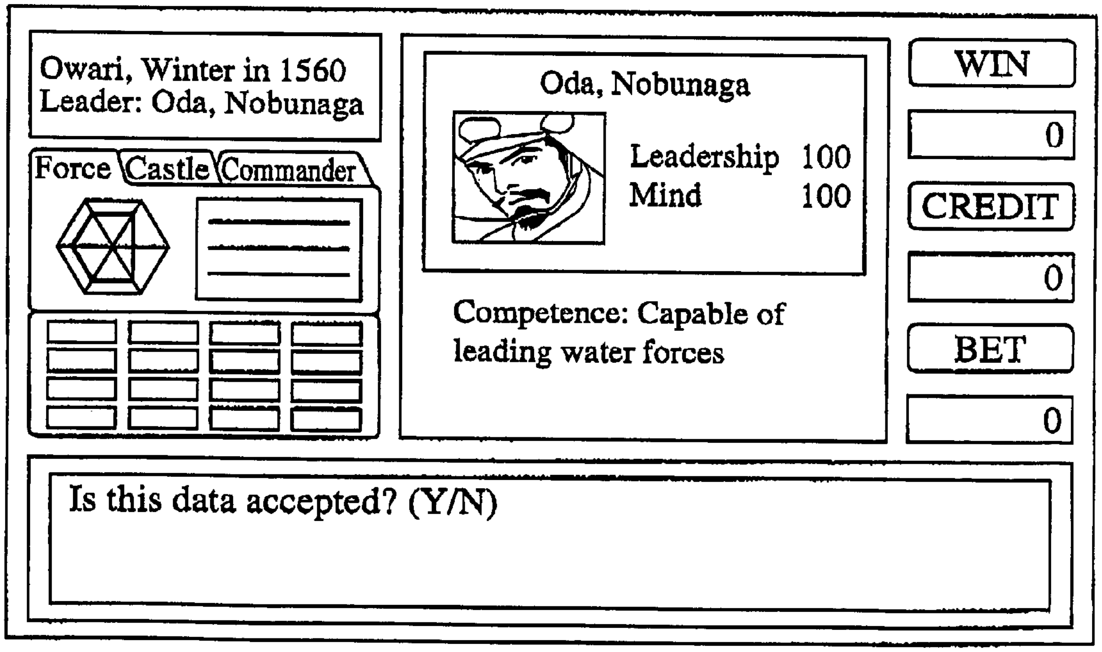

The screen image shown in FIG. 6B is a screen image displayed on screens 14$a$ of image display devices 14 provided in satellites 12 when the game is started using token with built-in IC chip 30β shown in FIG. 3.

An image showing the virtual year, season and location of the group in the strategic simulation game is displayed at the top left of the screen in the same manner as the image shown in FIG. 6A and an image showing the leader of group A controlled by the player who is going to start the strategic simulation game at the satellite 12 is displayed beneath the image showing the virtual year, season and location of the group. Furthermore, an image showing the capability values of group A controlled by the player who is going to start the strategic simulation game at the satellite 12 is displayed beneath the image showing the leader.

The image showing the expressions of "Oda Nobunaga" who is the leader of group A and the image showing the capability values are displayed in the center portion of the screen.

This image showing the capability values is an image displayed based on the game initial data set stored in token with built-in IC chip 30β. That is to say, "Leadership" is displayed as "100" in response to capability value $P_1$ set in the game initial data set and "Mind" is displayed as "100" in response to capability value $P_2$ set in the game initial data set.

An image of "Competence: Capable of leading water forces" showing a special ability of "Oda Nobunaga" who is the leader of group A is displayed beneath the image showing the capability values. This special capability is due to a special bonus data set B included in the game initial data set stored in a token with built-in IC chip 30β. Accordingly, it becomes possible for the player to control the water forces from the point in time when the game is started by using this token with built-in IC chip 30β and, thereby, the game can be advanced in an advantageous manner.

"WIN," "0," "CREDIT," "0," "BET" and "0" shown on the right side of the screen indicate that the number of accumulated tokens acquired by a player who is going to start the strategic simulation game at satellite 12 is 0, the points stored in the RAM 133 of the satellite 12 is 0, and the like.

In addition, an operational procedure wherein "Is this data accepted?" is displayed on the lower portion of the screen and "(Y/N)," indicating the selection, is shown in response to this operational procedure.

At this time, the strategic simulation game can be started using the token with built-in IC chip 30β in the case where the player selects "Y."

Figure 6C:
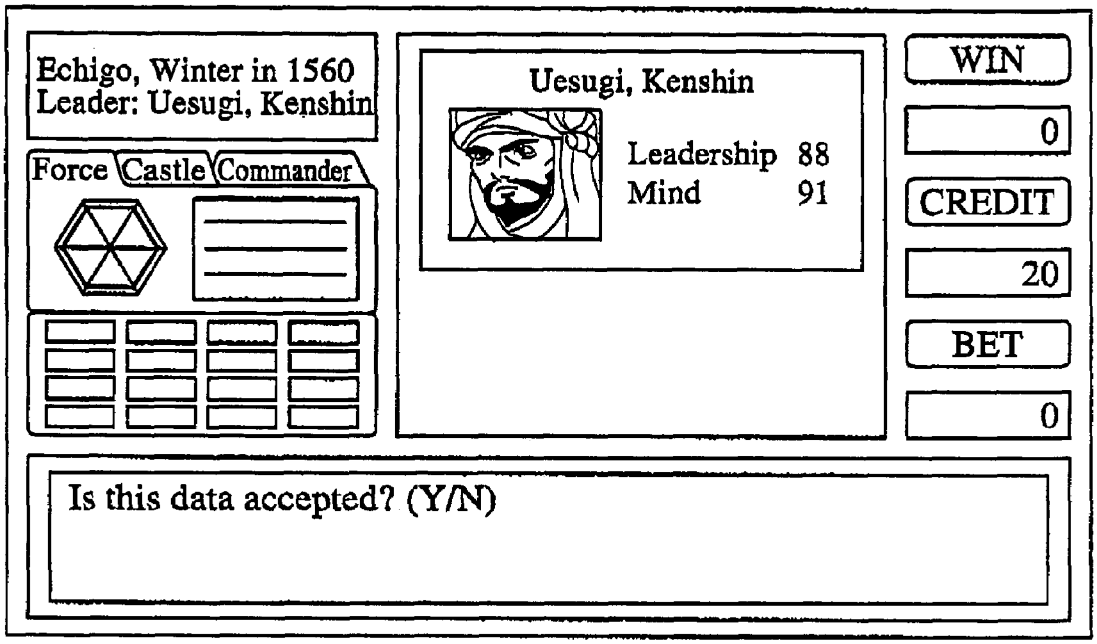

The screen image shown in FIG. 6C is a screen image displayed on screens 14A of image display devices 14 provided in the satellite 12 when the game is started using the token with built-in IC chip 30γ shown in FIG. 3.

The image "Echigo, Winter in 1560" displayed at the top left of the screen is an image indicating the virtual year, season and location of the group in the strategic simulation game while the image "Leader: Uesugi Kenshin" displayed beneath the image "Echigo, Winter in 1560" is an image indicating that the leader of the group (hereinafter referred to as group B), which is controlled by the player who is going to start the strategic simulation game at the satellite 12, is Uesugi Kenshin. Furthermore, an image indicating the capability values of group B, controlled by the player who is going to start the strategic simulation game at satellite 12, is displayed beneath the screen "Leader: Uesugi Kenshin."

An image showing the facial expression of "Uesugi Kenshin" who is the leader of group B and an image showing the capability values are displayed in the center portion of the screen.

This image showing the capability values is a displayed image based on the game initial data set stored in token with built-in IC chip 30γ. That is to say, "Leadership" is displayed as "88" in response to capability value $P_1$ set in the game initial data set and "Mind" is displayed as "91" in response to capability value $P_2$ set in the game initial data set.

"WIN," "0," "CREDIT," "20," "BET" and "0" are displayed on the right side of the screen. The "CREDIT" and "20" indicate that the number of points stored in the RAM 133 in the satellite 12 is 20 and this number of points is due to the bonus data set $B_2$ included in the game initial data set stored in the token with built-in IC chip 30γ.

Accordingly, the player can start the game in the condition wherein 20 points have been allotted when the player uses this token with built-in IC chip 30γ.

In addition, an operational procedure wherein "Is this data accepted?" is displayed on the lower portion of the screen and "(Y/N)," indicating the selection, is shown in response to this operational procedure.

At this time, the strategic simulation game can be started using token with built-in IC chip 30γ in the case where the player selects "Y."

Figure 6D:
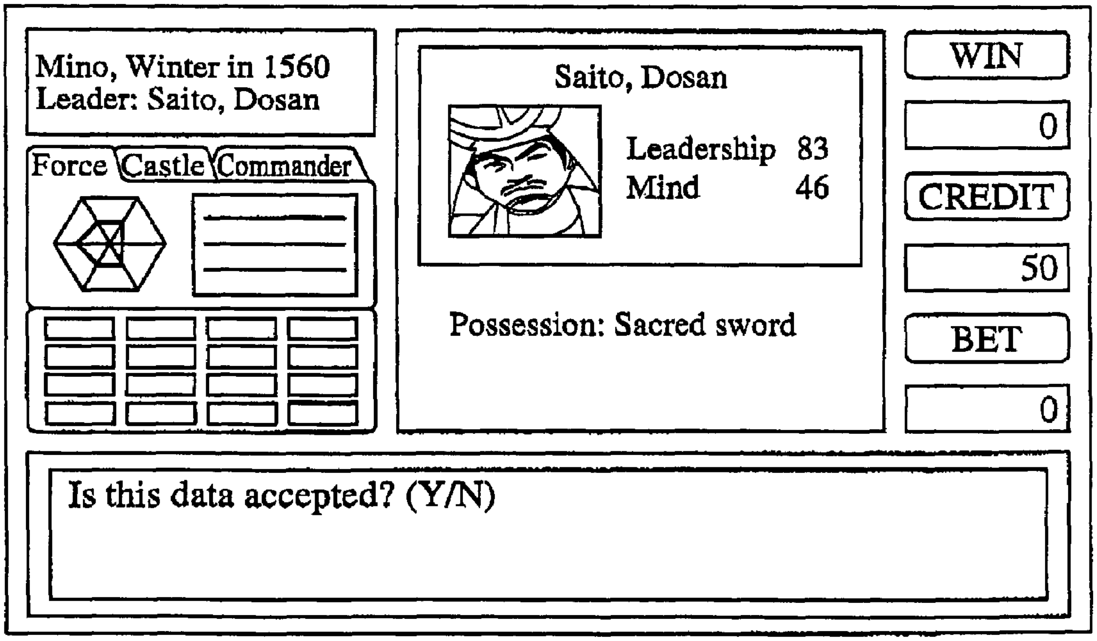

The screen image shown in FIG. 6D is a screen image displayed on screens 14$a$ of image display devices 14 provided in the satellite 12 when the game is started using the token with built-in IC chip 30δ shown in FIG. 3.

The image "Mino, Winter in 1560" displayed at the top left of the screen is an image indicating the virtual year, season and location of the group in the strategic simulation game while the image "Leader: Saito Dosan" displayed beneath the image "Mino, Winter in 1560" is an image indicating that the leader of the group (hereinafter referred to as group C), which is controlled by a player who is going to start the strategic simulation game at the satellite 12, is Saito Dosan. Furthermore, an image indicating the capability values of group C, controlled by the player who is going to start the strategic simulation game at satellite 12, is displayed beneath the screen "Leader: Saito Dosan."

An image showing the facial expression of "Saito Dosan" who is the leader of group C and an image showing the capability values are displayed in the center portion of the screen.

This image showing the capability values is a displayed image based on the game initial data set stored in token with built-in IC chip 30γ. That is to say, "Leadership" is displayed as "83" in response to capability value $P_1$ set in the game initial data set and "Mind" is displayed as "46" in response to capability value $P_2$ set in the game initial data set.

"Possession: Sacred sword," which is a personal effect of "Saito Dosan" who is the leader of group C, is displayed beneath the above described indication of ability and this special ability is due to the bonus data set $B_1$ included in the game initial data set stored in token γ with a built-in IC chip. Accordingly, the game can be started in the condition wherein "Saito Dosan," who is the leader of group C, is in possession of a treasured sword by using this token with built-in IC chip 30δ and, therefore, battles with other groups can be carried out in an advantageous manner.

"WIN," "0," "CREDIT," "50," "BET" and "0" are displayed on the right side of the screen. The "CREDIT" and "50" indicate that the number of points stored in the RAM 133 in the satellite 12 is 50 and this number of points is due to the bonus data set $B_2$ included in the game initial data set stored in token with built-in IC chip 30δ.

Accordingly, a player can start the game in the condition wherein 50 points have been allotted when the player uses this token with built-in IC chip 30δ.

Thus, according to this invention, the token with built-in IC chip is provided with a storage section in which, at least, game initial data set can be stored so that one piece of game initial data set selected from a data group composed of a plurality of pieces of game initial data set has been stored in the above described storage section prior for use of the token with built-in IC chip for the game and, therefore, it is possible for a player to acquire a token with built-in IC chip in which game initial data set is stored, which data differs according to each purchase of the token with built-in IC chip. Thus, tokens with built-in IC chip, in which are stored game initial data sets differing from each other, have new values that do not exist in conventional tokens and have different values in the strategic simulation game for the player, although their appearances are not different from each other.

In addition, a player collects tokens with built-in IC chip in which such data is stored and, thereby, it becomes possible to play the strategic simulation game using a token with built-in IC chip in which game initial data set differing according to each game is stored. Furthermore, a plurality of tokens with built-in IC chip have values differing from each other and, therefore, it becomes possible for a player to develop an emotional attachment to a token with built-in IC chip in which the data regarding the character (samurai commander) that the player likes is stored.

As described above according to this invention, the token has a new value that does not exist in conventional tokens and each of the tokens has, prior to use of the token for the game, a value that differs from other tokens and, therefore, the desire of a player to collect tokens (tokens with built-in IC chip) is stimulated and a player can develop an emotional attachment to a token so that the desire of a player to purchase additional tokens with built-in IC chip can be stimulated.

In addition, it is possible to encourage the player to devote himself/herself to the game by allowing tokens with built-in IC chip according to this invention to be used in a gaming machine and, furthermore, the gaming machine has an entertainment value that a conventional gaming machine does not have as well as the entertainment value of the game itself so that a very entertaining gaming machine where the entertainment value is doubled can be realized.

What is claimed is:

1. A token for a gaming machine on which a player plays a game by controlling a character, comprising:

an integrated circuit chip having a storage section storing at least game initial data regarding the character and being attachable to and detachable from a figure identifying one of a plurality of selectable characters;

wherein the game initial data is selectable from the identified character's initial data and is read by the gaming machine when the figure with the token is set on the gaming machine, and has a bonus data set providing a predetermined profit in a game.

2. The token according to claim 1 wherein:

the storage section includes flash memory, and the integrated circuit chip includes a microcomputer, a control gate array, and a connector.

3. The token according to claim 1 wherein the game initial data includes a character data set regarding the character controlled by the player with the gaming machine, a bonus data set, or a combination thereof.

4. The token according to claim 1 wherein the game initial data stored in the storage section is selected randomly from a game initial data group.

5. The token according to claim 1 wherein the token is utilized for providing a strategic simulation game.

6. The token according to claim 1 wherein:

the game initial data is data for the character selected from a plurality of game initial data which includes condition data for each of the plurality of selectable characters, the condition data for each of the plurality of selectable characters includes a plurality of different condition data, and the selected data includes condition data selected from the plurality of different condition data for the identified character.

7. The token according to claim 1 wherein:

the token is attachable to the figure by insertion into a recess in a surface of the figure.

8. The token according to claim 1 wherein the game initial data also includes an identification code identifying the token.

9. The token according to claim 1 wherein:

the gaming machine is configured to commence play of the game only after receipt of a payable value from the player.

10. The token according to claim 1 wherein:

the token is securable in a recess formed in a bottom face of a base portion of the figure.

11. A figure for a gaming machine, comprising:

a form identifying one of a plurality of characters which is used in the gaming machine;

a base portion to which the form is attached; and a token having an intecirated circuit chin with a storage section for storing at least game initial data, and being attachable to and detachable from the base portion;

wherein the name initial data stored in the storage section is read by the gaming machine when the figure with the token is set on the gaming machine, and has bonus data-providing a predetermined profit in the game.

12. The figure according to claim 11 wherein:

the storage section includes flash memory, and the integrated circuit chip includes a microcomputer, a control gate array, and a connector.

13. The figure according to claim 11 wherein the game initial data includes a character data set regarding the one character.

14. The figure according to claim 11 wherein the game initial data stored in the storage section is selected randomly from a game initial data group.

15. The figure according to claim 11 wherein the token is attached to the base portion in order to provide a strategic simulation game.

16. The token according to claim 11 wherein: the token is secured in a recess formed in a bottom face of the base.

17. A token for a gaming machine on which a player plays a game by controlling one of a plurality of selectable characters, comprising:

a storage section storing at least game initial data, and being attachable to and detachable from a figure identifying one of the plurality of selectable characters;

wherein the game initial data stored in the storage section is read by the gaming machine when the figure with the token is set on the gaming machine;

wherein the gaming machine is configured to dispense, to the player based on progress of the play of the game, a game coin having a size and a thickness corresponding to a coin slot for inserting the game coin into the gaming machine to commence or continue play of the game; and wherein the token has a size and thickness substantially similar to the size and the thickness of the game coin.

18. The token according to claim 17 wherein:

the figure is a three dimensional representation of the identified character.

19. The token according to claim 17 wherein:

the game initial data is data for the identified character selected from a plurality of game initial data which includes condition data for each of the plurality of selectable character, the condition data for each of the plurality of selectable characters includes a plurality of different condition data, and the selected data includes condition data selected from the plurality of different condition data for the identified character.

20. The token according to claim 17 wherein:

the token has a shape so as to be attachable to the figure by insertion into a recess in a surface of the figure.

21. The token according to claim 17 wherein the game initial data includes an identification code identifying the token.

22. The token according to claim 17 wherein:

the gaming machine is configured to commence play of the game only after receipt of a payable value from the player, and the stored game initial data also includes a bonus data set having the payable value.

23. The token according to claim 17 wherein:

the token is securable in a recess formed in a bottom face of a base portion of the figure.

24. The token according to claim 17 wherein:

the game initial data is selected data from a group of initial data for the identified character.

25. A token for a gaming machine on which a player plays a game by controlling one of a plurality of selectable characters comprising:

a storage section storing at least game initial data, and being attachable to and detachable from a figure identifying one of the plurality of selectable characters;

wherein the game initial data stored in the storage section is read by the gaming machine when the figure with the token is set on the gaming machine; and wherein the game initial data includes a bonus data set for providing a predetermined profit in the game.

26. A token for a gaming machine on which a player plays a game by controlling a character, comprising:

an integrated circuit chip having a storage section storing at least game initial data regarding the character and being attachable to and detachable from a figure identifying one of a plurality of selectable characters;

wherein the game initial data is selectable from the identified character's initial data and is read by the gaming machine when the figure with the token is set on the gaming machine, wherein:

the gaming machine is configured to dispense, to the player based on progress of the play of the game, a game coin having a size and a thickness corresponding to a coin slot for inserting the game coin into the gaming machine to commence or continue play of the game, and the token has a size and thickness substantially similar to the size and the thickness of the game coin.

* * * * *